United States Patent
Li et al.

(10) Patent No.: US 12,518,177 B2
(45) Date of Patent: Jan. 6, 2026

(54) METHOD, APPARATUS, DEVICE AND STORAGE MEDIUM FOR CONSTRUCTING KNOWLEDGE GRAPH

(71) Applicant: BEIJING BAIDU NETCOM SCIENCE AND TECHNOLOGY CO., LTD., Beijing (CN)

(72) Inventors: Qian Li, Beijing (CN); Yabing Shi, Beijing (CN); Ye Jiang, Beijing (CN); Chunguang Chai, Beijing (CN); Yong Zhu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 1314 days.

(21) Appl. No.: 17/116,979

(22) Filed: Dec. 9, 2020

(65) Prior Publication Data
US 2021/0334669 A1 Oct. 28, 2021

(30) Foreign Application Priority Data
Apr. 27, 2020 (CN) .......................... 202010345691.4

(51) Int. Cl.
*G06N 5/022* (2023.01)
*G06F 16/36* (2019.01)
(Continued)

(52) U.S. Cl.
CPC ............. *G06N 5/022* (2013.01); *G06F 16/36* (2019.01); *G06F 16/9024* (2019.01);
(Continued)

(58) Field of Classification Search
CPC .......... G06N 5/02; G06N 5/022; G06N 5/025; G06N 5/04; G06N 5/045; G06N 5/046;
(Continued)

(56) References Cited

U.S. PATENT DOCUMENTS

| 5,093,869 A | * | 3/1992 | Alves ................... G06V 10/426 |
| | | | 382/199 |
| 10,534,810 B1 | | 1/2020 | Manor et al. |

(Continued)

FOREIGN PATENT DOCUMENTS

| CN | 109948073 A | 6/2019 |
| CN | 110 019 843 | 7/2019 |

(Continued)

OTHER PUBLICATIONS

European Search Report of Jun. 21, 2021 for European Patent Application No. 20212230.5. 8 pages.
(Continued)

*Primary Examiner* — Shane D Woolwine
(74) *Attorney, Agent, or Firm* — Knobbe, Martens, Olson & Bear, LLP

(57) ABSTRACT

A method, apparatus, device, and storage medium for constructing a knowledge graph, relates to the field of data processing, and specifically to artificial intelligence technology is provided. The method may include: determining a scene and a scene element of the scene; determining a target tag from attribute tags based on an association relationship between an entity and the scene element, and an association relationship between the entity and each of the attribute tags; and establishing an edge between a scene node and a target tag node, to obtain a knowledge graph including scene information.

16 Claims, 3 Drawing Sheets

(51) Int. Cl.
  *G06F 16/901* (2019.01)
  *G06F 18/20* (2023.01)
  *G06F 18/213* (2023.01)
  *G06N 5/02* (2023.01)
  *G06N 5/025* (2023.01)

(52) U.S. Cl.
  CPC ............ *G06F 18/213* (2023.01); *G06F 18/29* (2023.01); *G06N 5/02* (2013.01); *G06F 16/367* (2019.01); *G06N 5/025* (2013.01)

(58) Field of Classification Search
  CPC ........ G06N 5/047; G06N 20/00; G06N 20/10; G06N 20/20; G06F 16/36; G06F 16/9024; G06F 16/367; G06F 18/213; G06F 18/29
  See application file for complete search history.

(56) References Cited

U.S. PATENT DOCUMENTS

| | | | |
|---|---|---|---|
| 2007/0124291 | A1 | 5/2007 | Hassan et al. |
| 2012/0072402 | A1 | 3/2012 | Fraboulet-Laudy et al. |
| 2016/0292304 | A1 | 10/2016 | Kartha et al. |
| 2019/0102625 | A1 | 4/2019 | Tippana |
| 2019/0179878 | A1 | 6/2019 | Collins et al. |
| 2020/0081931 | A1 | 3/2020 | Hirmer et al. |
| 2020/0401835 | A1* | 12/2020 | Zhao .................... G06V 10/426 |
| 2021/0118442 | A1* | 4/2021 | Poddar ................ G06F 16/9536 |
| 2021/0312783 | A1* | 10/2021 | Lee .................... G08B 21/0227 |

FOREIGN PATENT DOCUMENTS

| | | |
|---|---|---|
| CN | 110377676 A | 10/2019 |
| CN | 110580516 A | 12/2019 |
| CN | 110611651 A | 12/2019 |
| CN | 110688495 A | 1/2020 |
| CN | 110825882 A | 2/2020 |
| CN | 110955764 A | 4/2020 |
| CN | 111026965 A | 4/2020 |
| JP | H 04306499 | 10/1992 |
| JP | 2013-509094 | 3/2013 |
| JP | 2014-533868 | 12/2014 |
| JP | 2017-531240 | 10/2017 |
| JP | 2018-160254 | 10/2018 |
| KR | 10-1994-0006841 B1 | 7/1994 |
| KR | 10-2014-0079823 A | 6/2014 |
| KR | 10-2020-0042739 | 4/2020 |
| WO | WO 2020-063092 | 4/2020 |

OTHER PUBLICATIONS

Korean Office Action of May 11, 2022 for Korean Patent Application No. 2022-035208570 (5 pages).

Scene Graph Generation by Exploration of Agent in Three-Dimensional Space, Donghyeop Shin, Incheol Kim, Department of Computer Science, Kyonggi University (pp. 742-745).

Japanese Office Action of Feb. 22, 2022 for Japanese Patent Application No. 2020-205138.

* cited by examiner

METHOD, APPARATUS, DEVICE AND STORAGE MEDIUM FOR CONSTRUCTING KNOWLEDGE GRAPH

CROSS-REFERENCE TO RELATED APPLICATIONS

This application claims priority to Chinese Application No. 202010345691.4, filed on Apr. 27, 2020 and entitled "Method, Apparatus, Device and Storage Medium for Constructing Knowledge Graph," which is hereby incorporated by reference in its entirety.

TECHNICAL FIELD

Embodiments of the present disclosure relate to the field of data processing, and specifically to artificial intelligence technology. Specifically, embodiments of the present disclosure provide a method, apparatus, device, and storage medium for constructing a knowledge graph.

BACKGROUND

Knowledge graph technology is an important part of artificial intelligence technology, describing concepts, entities and relationships between the entities in the objective world in a structured method. Knowledge graph technology provides the capability to organize, manage and understand massive amount of information on the Internet, and express the information on the Internet in a form closer to the human cognitive world.

The number and types of knowledge in a knowledge graph are important indicators for evaluating the knowledge graph. The knowledge graph having rich knowledge may generate application values in intelligent information services such as intelligent search, intelligent Q&A, and personalized recommendation. How to enrich the knowledge in the knowledge graph to make the knowledge graph generate greater application values in the intelligent information services is a problem faced by the current knowledge graph technology.

SUMMARY

Embodiments of the present disclosure provide a method, apparatus, device, and storage medium for constructing a knowledge graph.

In a first aspect, an embodiment of the present disclosure provides a method for constructing a knowledge graph, the method including: determining a scene and a scene element of the scene; determining a target tag from attribute tags based on an association relationship between an entity and the scene element, and an association relationship between the entity and each of the attribute tags; and establishing an edge between a scene node and a target tag node, to obtain a knowledge graph comprising scene information.

In a second aspect, an embodiment of the present disclosure provides an apparatus for constructing a knowledge graph, the apparatus including: a scene determination module, configured to determine a scene and a scene element of the scene; a target tag determination module, configured to determine a target tag from attribute tags based on an association relationship between an entity and the scene element, and an association relationship between the entity and each of the attribute tags; and a graph establishing module, configured to establish an edge between a scene node and a target tag node, to obtain a knowledge graph comprising scene information.

In a third aspect, an embodiment of the present disclosure provides an electronic device, the device electronic including: at least one processor; and a memory, communicatively connected with the at least one processor, the memory storing instructions executable by the at least one processor, the instructions, when executed by the at least one processor, causing the at least one processor to perform the method according to embodiments of the present disclosure.

In a fourth aspect, an embodiment of the present disclosure provides a non-transitory computer readable storage medium, storing computer instructions, the computer instructions being used to cause a computer to perform the method according to embodiments of the present disclosure.

According to the technical solution of embodiments of the present disclosure, knowledge in the knowledge graph is enriched, so that the knowledge graph may generate greater application values in intelligent information services such as intelligent search, intelligent Q&A, or personalized recommendation.

It should be appreciated that the description of the Summary is not intended to limit the key or important features of embodiments of the present disclosure, or to limit the scope of the present disclosure. Other features of the present disclosure will become readily comprehensible through the following description.

BRIEF DESCRIPTION OF THE DRAWINGS

The accompanying drawings are used to better understand the present solution and do not constitute a limitation to the present disclosure.

DETAILED DESCRIPTION OF EMBODIMENTS

Example embodiments of the present disclosure are described below in combination with the accompanying drawings, and various details of embodiments of the present disclosure are included in the description to facilitate understanding, and should be considered as illustrative only. Accordingly, it should be recognized by one of the ordinary skilled in the art that various changes and modifications may be made to embodiments described herein without departing from the scope and spirit of the present disclosure. Also, for clarity and conciseness, descriptions for well-known functions and structures are omitted in the following description.

Figure 1:
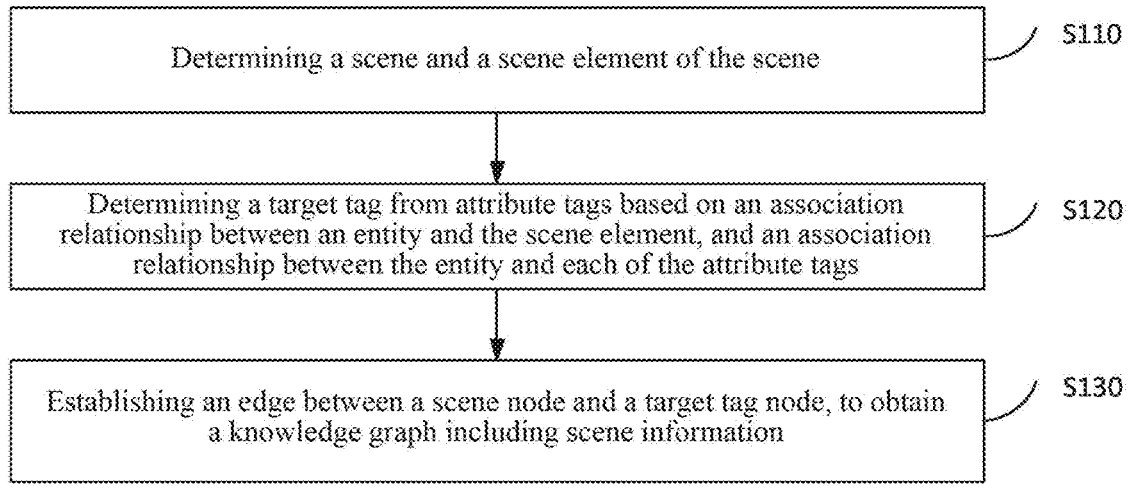
FIG. 1 is a flowchart of a method for constructing a knowledge graph provided by an embodiment of the present disclosure.

FIG. 1 is a flowchart of a method for constructing a knowledge graph provided by an embodiment of the present disclosure. The present embodiment may be applied to a situation where a knowledge graph is enriched with scene information to improve application values of the knowledge graph in intelligent information services. Referring to FIG. 1, the method for constructing a knowledge graph provided by an embodiment of the present disclosure includes following steps.

S110, determining a scene and a scene element of the scene.

Here, the scene generally refers to situations, such as waiting for a car scene, a date scene, or a scene of heavy snow.

The scene element refers to elements constituting the scene. Specific scene elements maybe crowd in the scene, a place where the scene occurs, and time when the scene occurs, etc. The number of the scene elements associated with the scene may be one, two or more.

For example, if the scene is relatively complex, a plurality of scene elements may be used to construct the scene completely; or if the scene is relatively simple, the construction of the scene may be realized by using a fewer number of scene elements.

In order to unify the data volume of the scene elements for subsequent calculations, the elements that construct the scene may be learned regularly, and a template of the scene elements may be determined according to the rules of learning. For example, the template of the scene elements may be crowd, time, place, requirement, and emotion.

Alternatively, the determining the scene includes: determining the scene based on the scene element; or, determining the scene based on requirement information.

Specifically, determining the scene based on the scene element includes: determining the scene based on the scene element, based on a mapping relationship between the scene element and the scene; or, performing semantic analysis on the scene element, summarizing based on an analysis result to obtain the scene associated with the scene element.

Specifically, the determining the scene element of the scene includes: determining a target data source associated with the entity; and extracting the scene element from data of the target data source.

For example, if the entity is a POI (Point of Interest), the target data source may be comment data.

If the entity is a person, the target data source may be a person's biography.

Because the target data source is associated with the entity, based on the target data source, the accuracy and efficiency in extracting the scene element may be improved.

Alternatively, the scene element may be extracted from the data of the target data source based on the frequency of occurrence of a word; or the scene element may be extracted from the data of the target data source based on the frequency of co-occurrence of the word and the scene.

S120, determining a target tag from attribute tags based on an association relationship between an entity and the scene element, and an association relationship between the entity and each of the attribute tags.

Here, the attribute tag is a tag that describes an attribute of the entity. Specifically, the attribute tag may be a classification tag or other descriptive tags. The present embodiment does not impose any limitation thereon.

The target tag refers to a tag associated with the scene.

Specifically, determining the target tag from the attribute tags based on the association relationship between the entity and the scene element, and the association relationship between the entity and each of the attribute tags, includes: determining association information between the scene element and each of the attribute tags based on the association relationship between the entity and the scene element, and the association relationship between the entity and the each of the attribute tags; and determining the target tag from the attribute tags based on the association information between the scene element and each of the attribute tags.

The association information refers to information associated between the scene element and each of the attribute tags. Specifically, the association information may be whether there is an association relationship between the scene element and each of the attribute tags.

Specifically, determining the target tag from the attribute tags based on the association information between the scene element and each of the attribute tags, includes: determining the attribute tag as the target tag, in response to determining that the association information between the scene element and the attribute tag is an association relationship.

S130, establishing an edge between a scene node and a target tag node, to obtain a knowledge graph including scene information.

The scene node refers to a node of the scene presented in the knowledge graph.

The target tag node refers to a node of the target tag presented in the knowledge graph.

Figure 2:
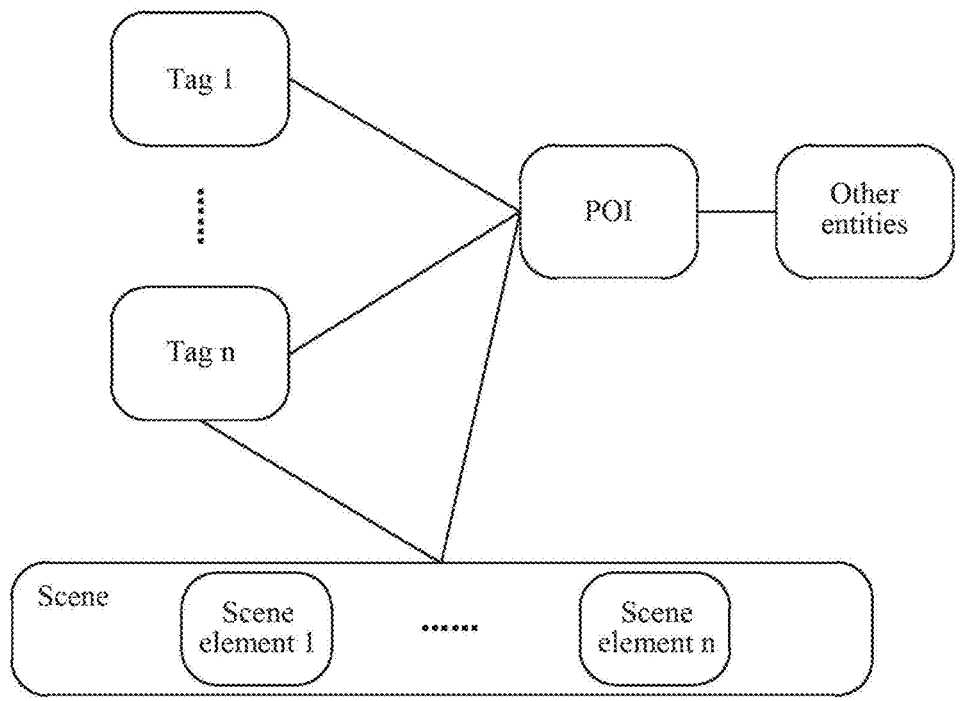
FIG. 2 is a schematic structural diagram of a knowledge graph provided by an embodiment of the present disclosure.

For example, taking the entity being a POI as an example, the effect of the constructed knowledge graph is referred to FIG. 2.

The above technical solution of embodiments of the present disclosure uses the scene element as an intermediary to mine an implicit relationship between the tag and the scene, and construct the knowledge graph based on the implicit relationship, thereby enriching the knowledge in the knowledge graph, and making the knowledge graph generate greater application values in intelligent information services such as intelligent search, intelligent Q&A, or personalized recommendation.

Figure 3:
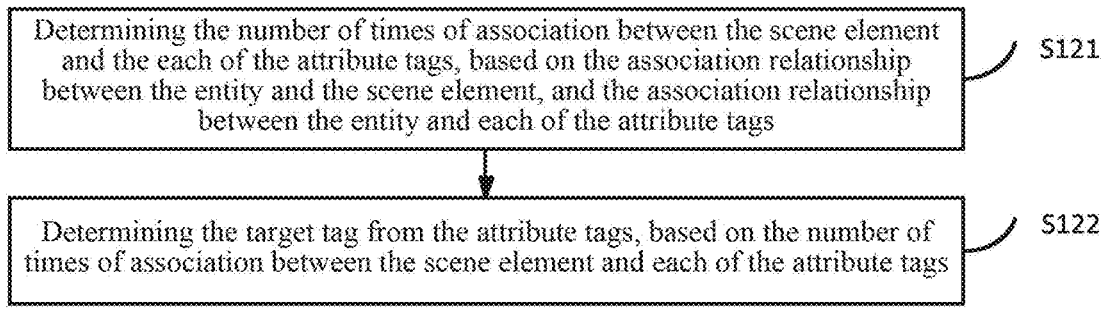
FIG. 3 is a flowchart of another method for constructing a knowledge graph provided by an embodiment of the present disclosure.

FIG. 3 is a flowchart of another method for constructing a knowledge graph provided by an embodiment of the present disclosure. Referring to FIG. 3, as described in the foregoing embodiment of the present disclosure, in order to improve the accuracy of the target tag, the foregoing S120 is expanded.

Specifically, the foregoing S120 includes following steps.

S121, determining the number of times of association between the scene element and each of the attribute tags, based on the association relationship between the entity and the scene element, and the association relationship between the entity and each of the attribute tags.

S122, determining the target tag from the attribute tags, based on the number of times of association between the scene element and each of the attribute tags.

Specifically, the greater the number of times of association, the greater the probability of determining the attribute tag as the target tag.

Specifically, determining the target tag from the attribute tags, based on the number of times of association between the scene element and each of the attribute tags, includes: sorting the attribute tags based on the number of times of association; and determining the target tag from the attribute tags, based on a sorting result.

For example, the attribute tag whose sorting result is in a previous set number position is determined as the target tag.

Based on the expansion of the above step, embodiments of the present disclosure may quantify the degree of relevance between the scene and the attribute tag. Because a quantified result may achieve an accurate measurement of the degree of relevance, based on the quantified degree of relevance between the scene and the attribute tag, the accuracy of the target tag may be improved.

In order to improve the accuracy and calculation efficiency of the target tag, the determining the target tag from the attribute tags, based on the number of times of association between the scene element and each of the attribute tags, includes: using the attribute tags as candidate tags, in response to determining that the number of times of association between the scene element and each of the attribute tags is greater than a set number of times threshold; determining a degree of relevance between each of the candidate tags and the scene based on a number of times of association between the scene element and each of the candidate tags; and determining the target tag from the candidate tags based on the degree of relevance.

The set number of times threshold refers to a minimum value of the number of times of association between the scene element and the attribute tag, in the case where the scene and the attribute tag may be associated.

The candidate tag refers to an attribute tag that may be associated with the scene.

Based on this technical feature, embodiments of the present disclosure uses the set number of times threshold to filter out tags that are unlikely to be associated with the scene from the attribute tags, thereby increasing the subsequent calculation speed and further improving the calculation efficiency of the target tag.

In addition, by using the dual filtering of the set number of times threshold and the degree of relevance, the accuracy of the target tag may be further improved.

Specifically, the determining the degree of relevance between each of the candidate tags and the scene based on the number of times of association between the scene element and each of the candidate tags, includes: sorting the number of times of association between the scene element and each of the candidate tags; and determining the degree of relevance between each of the candidate tags and the scene based on a sorting result.

Alternatively, the determining the degree of relevance between each of the candidate tags and the scene based on the number of times of association between the scene element and each of the candidate tags, includes: determining a maximum value of the numbers of times of association between the scene element and the candidate tags; calculating a ratio of the number of times of association between the scene element and each of the candidate tags to the maximum value; and determining the degree of relevance between each of the candidate tags and the scene, based on the calculated ratio.

For example, assume that the scene elements include: A, B, C, and D, the scene is X (where X is constructed from A and B), and the attribute tags include a, b, c, and d. The determination of the target tag may be described as follows.

Related item mining: based on the number of times of association, determining candidate tags a and b from the attribute tags to form two related pairs of X-a and X-b.

Degree of relevance: if the maximum value of the numbers of times of association between X and the candidate tags is 10, the number of times of association of X-a is 10, and the number of times of association of X-b is 7, then the degree of relevance of X-a is determined as 100% and the degree of relevance of X-b is determined as 70%. The target tag is determined from the candidate tags based on the determined degree of relevance to improve the accuracy of the target tag.

Figure 4:
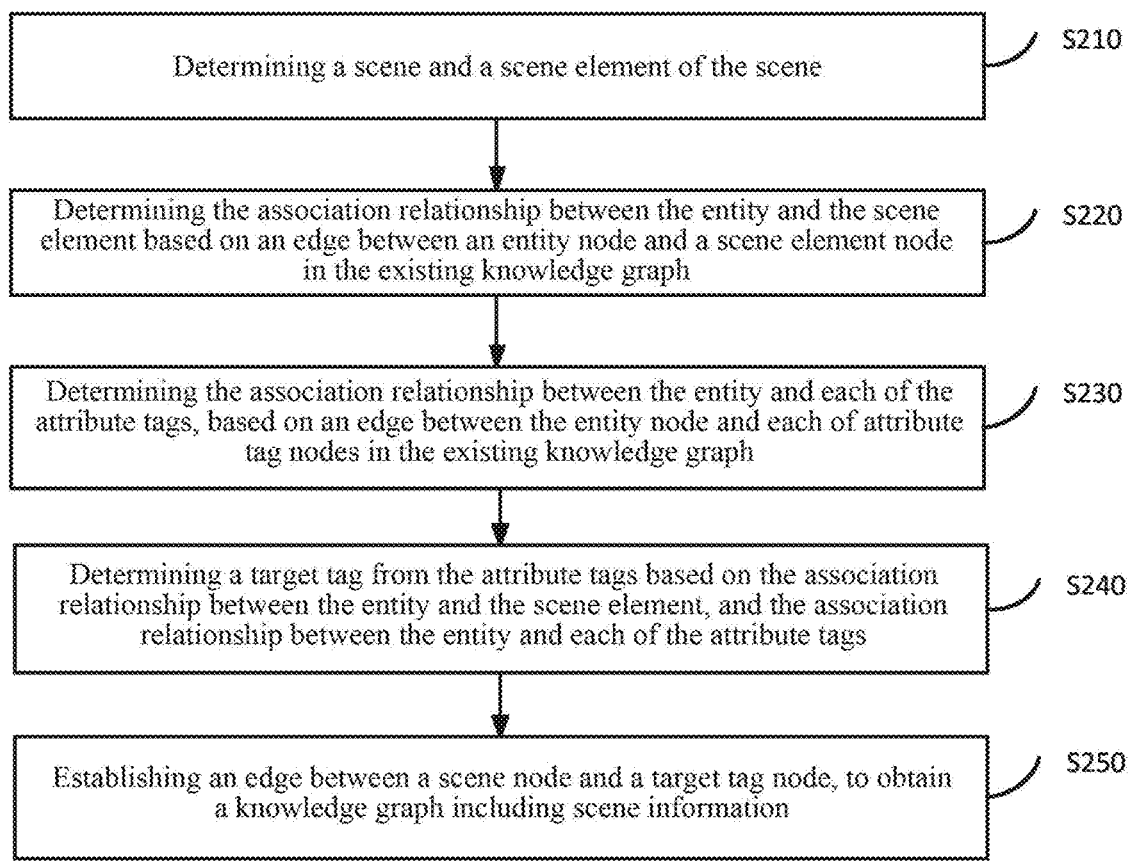
FIG. 4 is a flowchart of another method for constructing a knowledge graph provided by an embodiment of the present disclosure.

FIG. 4 is a flowchart of another method for constructing a knowledge graph provided by an embodiment of the present disclosure. Referring to FIG. 4, as in the foregoing embodiment of the present disclosure, in order to reduce the cost of mining the association relationship between the entity and the scene element, and the association relationship between the entity and each of the candidate tags, and increase the speed of mining the association relationships, the foregoing embodiment of the present disclosure may also be described as follows.

S210, determining a scene and a scene element of the scene.

S220, determining the association relationship between the entity and the scene element based on an edge between an entity node and a scene element node in the existing knowledge graph.

S230, determining the association relationship between the entity and each of the attribute tags, based on an edge between the entity node and each of attribute tag nodes in the existing knowledge graph.

S240, determining a target tag from the attribute tags based on the association relationship between the entity and the scene element, and the association relationship between the entity and each of the attribute tags.

S250, establishing an edge between a scene node and a target tag node, to obtain a knowledge graph including scene information.

Embodiments of the present disclosure does not limit the execution order of the foregoing steps. Alternatively, S230 may be executed before S220, or S230 and S220 may also be executed before S210.

In embodiments of the present disclosure, the association relationship between the entity and the scene element, as well as the association relationship between the entity and each of the attribute tags are mined from the existing knowledge graph, so as to realize a rapid acquisition of the association relationships and improve the efficiency of establishing the knowledge graph.

Figure 5:
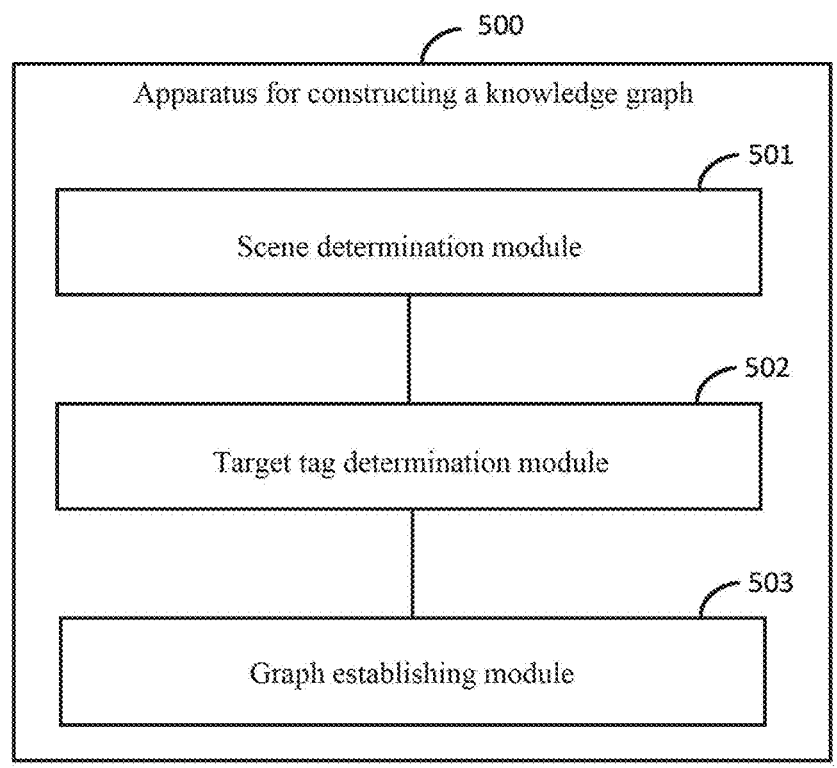
FIG. 5 is a schematic structural diagram of an apparatus for constructing a knowledge graph provided by an embodiment of the present disclosure.

FIG. 5 is a schematic structural diagram of an apparatus for constructing a knowledge graph provided by an embodiment of the present disclosure. Referring to FIG. 5, an apparatus 500 for constructing a knowledge graph provided by an embodiment of the present disclosure includes: a scene determination module 501, a target tag determination module 502 and a graph establishing module 503.

The scene determination module 501 is configured to determine a scene and a scene element of the scene.

The target tag determination module 502 is configured to determine a target tag from attribute tags based on an association relationship between an entity and the scene element, and an association relationship between the entity and each of the attribute tags.

The graph establishing module 503 is configured to establish an edge between a scene node and a target tag node, to obtain a knowledge graph including scene information.

The above technical solution of embodiments of the present disclosure uses the scene element as an intermediary to mine an implicit relationship between the tag and the scene, and construct the knowledge graph based on the implicit relationship, thereby enriching the knowledge in the knowledge graph, and making the knowledge graph generate greater application values in intelligent information services such as intelligent search, intelligent Q&A, or personalized recommendation.

Further, the target tag determination module 502 includes:

an information determination unit, configured to determine association information between the scene element and each of the attribute tags based on the association relationship between the entity and the scene element, and the association relationship between the entity and each of the attribute tags; and a target tag determination unit, configured to determine the target tag from the attribute tags based on the association information between the scene element and each of the attribute tags.

Further, the target tag determination unit includes: a tag determination subunit, configured to determine the target tag from the attribute tags, based on a number of times of association between the scene element and each of the attribute tags.

Further, the tag determination subunit includes: a candidate tag determination section, configured to use the attribute tags as candidate tags, in response to determining that the number of times of association between the scene element and each of the attribute tags is greater than a set number of times threshold; a degree of relevance determination section, configured to determine a degree of relevance between each of the candidate tags and the scene based on a number of times of association between the scene element and each of the candidate tags; and a target tag determination section, configured to determine the target tag from the candidate tags based on the degree of relevance.

Further, the degree of relevance determination section is specifically configured to: determine a maximum value of numbers of times of association between the scene element and the candidate tags; calculate a ratio of the number of times of association between the scene element and each of the candidate tags to the maximum value; and determine the degree of relevance between each of the candidate tags and the scene, based on the calculated ratio.

Further, the apparatus further includes: a scene relationship determination module, configured to, before determining the target tag from the attribute tags based on the association relationship between the entity and the scene element, and the association relationship between the entity and each of the attribute tags, determine the association relationship between the entity and the scene element based on an edge between an entity node and a scene element node in the existing knowledge graph; and a tag relationship determination module, configured to determine the association relationship between the entity and each of the attribute tags, based on an edge between the entity node and each of attribute tag nodes in the existing knowledge graph.

Further, the scene determination module includes: a scene determination unit, configured to determine the scene based on the scene element; or, determine the scene based on requirement information.

Further, the scene determination module includes: a data source determination unit, configured to determine a target data source associated with the entity; and an element extraction unit, configured to extract the scene element from data of the target data source.

Further, the scene element is at least one of elements constituting the scene; and the elements of the scene include, but are not limited to: crowd in the scene, a place where the scene occurs, and time when the scene occurs.

According to an embodiment of the present disclosure, the present disclosure also provides an electronic device and a readable storage medium.

Figure 6:
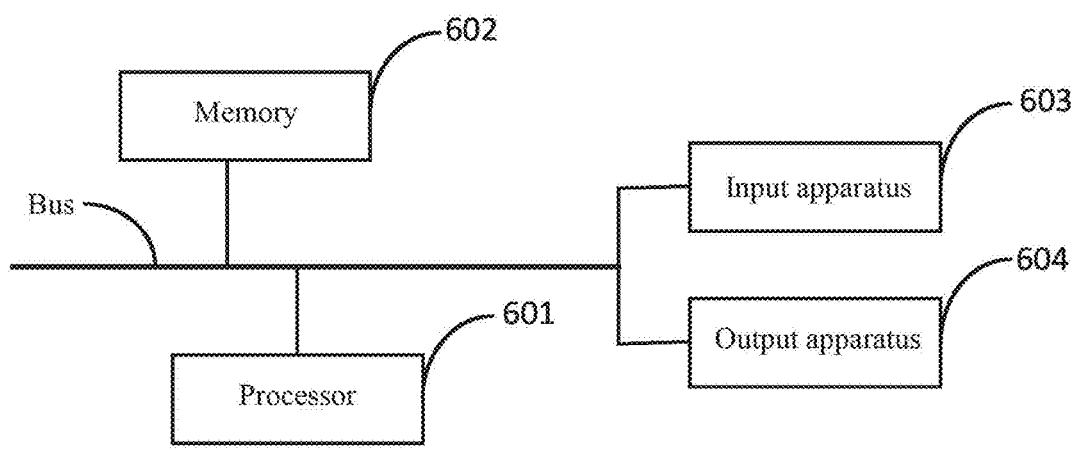
FIG. 6 is a block diagram of an electronic device for implementing the method for constructing a knowledge graph according to an embodiment of the present disclosure.

As shown in FIG. 6, is a block diagram of an electronic device of the method for constructing a knowledge graph according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the electronic device includes: one or more processors 601, a memory 602, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations, for example, as a server array, a set of blade servers, or a multi-processor system. In FIG. 6, one processor 601 is used as an example.

The memory 602 is a non-transitory computer readable storage medium provided by embodiments of the present disclosure. The memory stores instructions executable by at least one processor, so that the at least one processor performs the method for constructing a knowledge graph provided by embodiments of the present disclosure. The non-transitory computer readable storage medium of some embodiments of the present disclosure stores computer instructions for causing a computer to perform the method for constructing a knowledge graph provided by embodiments of the present disclosure.

The memory 602, as a non-transitory computer readable storage medium, may be used to store non-transitory software programs, non-transitory computer executable programs and modules, such as program instructions/modules corresponding to the method for constructing a knowledge graph in embodiments of the present disclosure (for example, the scene determination module 501, the target tag determination module 502 and the graph establishing module 503 as shown in FIG. 5). The processor 601 executes the non-transitory software programs, instructions, and modules stored in the memory 602 to execute various functional applications and data processing of the server, that is, to implement the method for constructing a knowledge graph in the foregoing method embodiments.

The memory 602 may include a storage program area and a storage data area, where the storage program area may store an operating system and at least one function required application program; and the storage data area may store data created by the use of the electronic device for constructing a knowledge graph. In addition, the memory 602 may include a high-speed random access memory, and may also include a non-transitory memory, such as at least one magnetic disk storage device, a flash memory device, or other non-transitory solid-state storage devices. In some embodiments, the memory 602 may optionally include memories remotely provided with respect to the processor 601, and these remote memories may be connected to the electronic device for constructing a knowledge graph through a network. Examples of the above network include but are not limited to the Internet, intranet, local area network, mobile communication network, and combinations thereof.

The electronic device of the method for constructing a knowledge graph may further include: an input apparatus 603 and an output apparatus 604. The processor 601, the memory 602, the input apparatus 603, and the output apparatus 604 may be connected through a bus or in other methods. In FIG. 6, connection through the bus is used as an example.

The input apparatus 603 may receive input digital or character information, and generate key signal inputs related to user settings and function control of the electronic device for constructing a knowledge graph, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various implementations of the systems and techniques described herein may be implemented in a digital electronic circuit system, an integrated circuit system, an application specific integrated circuit (ASIC), computer hardware, firmware, software, and/or combinations thereof.

These various implementations may include the implementation in one or more computer programs. The one or more computer programs may be executed and/or interpreted on a programmable system including at least one programmable processor, and the programmable processor may be a dedicated or general-purpose programmable processor, may receive data and instructions from a storage system, at least one input apparatus and at least one output apparatus, and transmit the data and the instructions to the storage system, the at least one input apparatus and the at least one output apparatus.

These computing programs, also referred to as programs, software, software applications or codes, include a machine instruction of the programmable processor, and may be implemented using a high-level procedural and/or an object-oriented programming language, and/or an assembly/machine language. As used herein, the terms "machine readable medium" and "computer readable medium" refer to any computer program product, device and/or apparatus (e.g., a magnetic disk, an optical disk, a storage device and a programmable logic device (PLD)) used to provide a machine instruction and/or data to the programmable processor, and include a machine readable medium that receives the machine instruction as a machine readable signal. The term "machine readable signal" refers to any signal used to provide the machine instruction and/or data to the programmable processor.

To provide an interaction with a user, the systems and techniques described here may be implemented on a computer having a display apparatus (e.g., a cathode ray tube (CRT)) or an LCD monitor) for displaying information to the user, and a keyboard and a pointing apparatus (e.g., a mouse or a track ball) by which the user may provide the input to the computer. Other kinds of apparatuses may also be used to provide the interaction with the user. For example, a feedback provided to the user may be any form of sensory feedback (e.g., a visual feedback, an auditory feedback, or a tactile feedback); and an input from the user may be received in any form, including acoustic, speech, or tactile input.

The systems and techniques described here may be implemented in a computing system (e.g., as a data server) that includes a backend part, implemented in a computing system (e.g., an application server) that includes a middleware part, implemented in a computing system (e.g., a user computer having a graphical user interface or a Web browser through which the user may interact with an implementation of the systems and techniques described here) that includes a frontend part, or implemented in a computing system that includes any combination of the backend part, the middleware part or the frontend part. The parts of the system may be interconnected by any form or medium of digital data communication (e.g., a communication network). Examples of the communication network include a local area network (LAN), a wide area network (WAN) and the block chain network.

The computer system may include a client and a server. The client and the server are generally remote from each other and typically interact through the communication network. The relationship between the client and the server is generated through computer programs running on the respective computer and having a client-server relationship to each other.

According to the technical solution of embodiments of the present disclosure, the knowledge in the knowledge graph is enriched, so that the knowledge graph may generate greater application value in intelligent information services such as intelligent search, intelligent Q&A, or personalized recommendation.

It should be understood that the various forms of processes shown above may be used to resort, add or delete steps. For example, the steps described in the present disclosure may be performed in parallel, sequentially, or in a different order. As long as the desired result of the technical solution disclosed in the present disclosure can be achieved, no limitation is made herein.

Embodiments do not constitute a limitation to the scope of protection of the present disclosure. It should be appreciated by those skilled in the art that various modifications, combinations, sub-combinations and substitutions may be made depending on design requirements and other factors. Any modifications, equivalents and replacements, and improvements falling within the spirit and the principle of the present disclosure should be included within the scope of protection of the present disclosure.

What is claimed is:

1. A method for constructing a target knowledge graph, the method comprising:
   determining a scene and a scene element of the scene, wherein the determining the scene element of the scene comprises determining a target data source associated with an entity, and extracting the scene element from data of the target data source, wherein the target data source comprises comment data or a biography, and the scene element is extracted from the comment data or the biography based on a frequency of occurrence of a word, or a frequency of co-occurrence of the word and the scene;
   determining an association relationship between the entity and the scene element based on an edge between an entity node and a scene element node in an initial knowledge graph;
   determining an association relationship between the entity and each of attribute tags, based on an edge between the entity node and each of attribute tag nodes in the initial knowledge graph;

determining a target tag from attribute tags based on an association relationship between the entity and the scene element, and an association relationship between the entity and each of the attribute tags;

obtaining the target knowledge graph by establishing a new edge between a scene node and a target tag node in the initial knowledge graph, wherein the scene node comprises the scene element node, and the scene element node and the target tag node are connected to the given entity node, wherein in the target knowledge graph, the target tag node is a node of a classification tag of the entity, and is connected to both the scene element node and the entity node; and performing a search by using the target knowledge graph.

2. The method according to claim 1, wherein the determining the target tag from the attribute tags based on the association relationship between the entity and the scene element, and the association relationship between the entity and each of the attribute tags, comprises:

determining association information between the scene element and each of the attribute tags based on the association relationship between the entity and the scene element, and the association relationship between the entity and each of the attribute tags; and determining the target tag from the attribute tags based on the association information between the scene element and each of the attribute tags.

3. The method according to claim 2, wherein the determining the target tag from the attribute tags based on the association information between the scene element and each of the attribute tags, comprises:

determining the target tag from the attribute tags, based on a number of times of association between the scene element and each of the attribute tags.

4. The method according to claim 3, wherein the determining the target tag from the attribute tags, based on the number of times of association between the scene element and each of the attribute tags, comprises:

using the attribute tags as candidate tags, in response to determining that the number of times of association between the scene element and each of the attribute tags is greater than a set number of times threshold;

determining a degree of relevance between each of the candidate tags and the scene based on a number of times of association between the scene element and each of the candidate tags; and determining the target tag from the candidate tags based on the degree of relevance.

5. The method according to claim 4, wherein the determining the degree of relevance between each of the candidate tags and the scene based on the number of times of association between the scene element and each of the candidate tags, comprises:

determining a maximum value of numbers of times of association between the scene element and the candidate tags;

calculating a ratio of the number of times of association between the scene element and each of the candidate tags to the maximum value; and determining the degree of relevance between each of the candidate tags and the scene, based on the calculated ratio.

6. The method according to claim 1, wherein the determining the scene, comprises:

determining the scene based on the scene element; or,
determining the scene based on requirement information.

7. The method according to claim 1, wherein the scene element is at least one of elements constituting the scene; and the elements of the scene comprise: crowd in the scene, a place where the scene occurs, and time when the scene occurs.

8. The method according to claim 1, wherein determining the scene and the scene element of the scene comprises:

determining a plurality of scene elements of the scene; and the scene node comprises a plurality of scene element nodes, establishing the new edge between the scene node and the target tag node in the initial knowledge graph comprises:

establishing the new edge between the scene node comprising the plurality of scene element nodes, and the target tag node, wherein a first element node of the plurality of scene element nodes and the target tag node are connected to the given entity node.

9. An electronic device, comprising:

at least one processor; and a memory, communicatively connected with the at least one processor;

the memory storing instructions executable by the at least one processor, the instructions, when executed by the at least one processor, causing the at least one processor to perform operations, the operations comprising:

determining a scene and a scene element of the scene, wherein the determining the scene element of the scene comprises determining a target data source associated with an entity, and extracting the scene element from data of the target data source, wherein the target data source comprises comment data or a biography, and the scene element is extracted from the comment data or the biography based on a frequency of occurrence of a word, or a frequency of co-occurrence of the word and the scene;

determining an association relationship between the entity and the scene element based on an edge between an entity node and a scene element node in an initial knowledge graph;

determining an association relationship between the entity and each of attribute tags, based on an edge between the entity node and each of attribute tag nodes in the initial knowledge graph;

determining a target tag from attribute tags based on an association relationship between the entity and the scene element, and an association relationship between the entity and each of the attribute tags;

obtaining a target knowledge graph by establishing a new edge between a scene node and a target tag node in the initial knowledge graph, wherein the scene node comprises the scene element node, and the scene element node and the target tag node are connected to the given entity node, wherein in the target knowledge graph, the target tag node is a node of a classification tag of the entity, and is connected to both the scene element node and the entity node; and performing a search by using the target knowledge graph.

10. The electronic device according to claim 9, wherein the determining the target tag from the attribute tags based on the association relationship between the entity and the scene element, and the association relationship between the entity and each of the attribute tags, comprises:

determining association information between the scene element and each of the attribute tags based on the association relationship between the entity and the scene element, and the association relationship between the entity and each of the attribute tags; and determining the target tag from the attribute tags based on the association information between the scene element and each of the attribute tags.

11. The electronic device according to claim 10, wherein the determining the target tag from the attribute tags based on the association information between the scene element and each of the attribute tags, comprises:

determining the target tag from the attribute tags, based on a number of times of association between the scene element and each of the attribute tags.

12. The electronic device according to claim 11, wherein the determining the target tag from the attribute tags, based on the number of times of association between the scene element and each of the attribute tags, comprises:

using the attribute tags as candidate tags, in response to determining that the number of times of association between the scene element and each of the attribute tags is greater than a set number of times threshold;

determining a degree of relevance between each of the candidate tags and the scene based on a number of times of association between the scene element and each of the candidate tags; and determining the target tag from the candidate tags based on the degree of relevance.

13. The electronic device according to claim 12, wherein the determining the degree of relevance between each of the candidate tags and the scene based on the number of times of association between the scene element and each of the candidate tags, comprises:

determining a maximum value of numbers of times of association between the scene element and the candidate tags;

calculating a ratio of the number of times of association between the scene element and each of the candidate tags to the maximum value; and determining the degree of relevance between each of the candidate tags and the scene, based on the calculated ratio.

14. The electronic device according to claim 9, wherein the determining the scene, comprises:

determining the scene based on the scene element; or, determining the scene based on requirement information.

15. The electronic device according to claim 9, wherein the scene element is at least one of elements constituting the scene; and the elements of the scene comprise: crowd in the scene, a place where the scene occurs, and time when the scene occurs.

16. A non-transitory computer readable storage medium, storing computer instructions, the computer instructions being used to cause a computer to perform operations, the operations comprising:

determining a scene and a scene element of the scene, wherein the determining the scene element of the scene comprises determining a target data source associated with an entity, and extracting the scene element from data of the target data source, wherein the target data source comprises comment data or a biography, and the scene element is extracted from the comment data or the biography based on a frequency of occurrence of a word, or a frequency of co-occurrence of the word and the scene;

determining an association relationship between the entity and the scene element based on an edge between an entity node and a scene element node in an initial knowledge graph;

determining an association relationship between the entity and each of attribute tags, based on an edge between the entity node and each of attribute tag nodes in the initial knowledge graph;

determining a target tag from attribute tags based on an association relationship between the entity and the scene element, and an association relationship between the entity and each of the attribute tags;

obtaining a target knowledge graph by establishing a new edge between a scene node and a target tag node in the initial knowledge graph, wherein the scene node comprises the scene element node, and the scene element node and the target tag node are connected to the given entity node, wherein in the target knowledge graph, the target tag node is a node of a classification tag of the entity, and is connected to both the scene element node and the entity node; and performing a search by using the target knowledge graph.

* * * * *